(12) United States Patent
Xu et al.

(10) Patent No.: US 11,769,905 B2
(45) Date of Patent: Sep. 26, 2023

(54) POLY(ALKYLENE OXIDE) SILOXANE-BASED ELECTROLYTES FOR RECHARGEABLE BATTERIES

(71) Applicant: UChicago Argonne, LLC, Chicago, IL (US)

(72) Inventors: Gui-Liang Xu, Downers Grove, IL (US); Jianzhao Liu, Lemont, IL (US); Zonghai Chen, Bolingbrook, IL (US); Khalil Amine, Oak Brook, IL (US)

(73) Assignee: UChicago Argonne, LLC, Chicago, IL (US)

( * ) Notice: Subject to any disclaimer, the term of this patent is extended or adjusted under 35 U.S.C. 154(b) by 837 days.

(21) Appl. No.: 15/670,295

(22) Filed: Aug. 7, 2017

(65) Prior Publication Data

US 2019/0044181 A1    Feb. 7, 2019

(51) Int. Cl.
| | |
|---|---|
| *H01M 4/38* | (2006.01) |
| *H01M 10/056* | (2010.01) |
| *C08K 3/30* | (2006.01) |
| *H01M 10/0525* | (2010.01) |
| *H01M 10/054* | (2010.01) |
| *H01M 10/0565* | (2010.01) |

(52) U.S. Cl.
CPC ............ *H01M 10/056* (2013.01); *C08K 3/30* (2013.01); *H01M 4/38* (2013.01); *H01M 10/054* (2013.01); *H01M 10/0525* (2013.01); *H01M 10/0565* (2013.01); *H01M 2300/0082* (2013.01); *H01M 2300/0091* (2013.01)

(58) Field of Classification Search
CPC .. H01M 10/056; H01M 10/0565; H01M 4/38; H01M 4/587; H01M 4/1395; H01M 4/1393; H01M 4/366
See application file for complete search history.

(56) References Cited

U.S. PATENT DOCUMENTS

| | | | |
|---|---|---|---|
| 8,475,688 B2 | 7/2013 | Chen et al. | |
| 9,005,808 B2 | 4/2015 | Abouimrane et al. | |
| 2007/0190415 A1* | 8/2007 | Sung .................... | H01M 4/38 429/218.1 |
| 2008/0134492 A1 | 6/2008 | Amine et al. | |
| 2010/0266907 A1* | 10/2010 | Yazami ................ | H01M 10/44 429/405 |
| 2012/0225353 A1* | 9/2012 | Yoshida ............. | H01M 4/0416 429/211 |
| 2015/0044545 A1 | 2/2015 | Liu et al. | |

OTHER PUBLICATIONS

Wenchen Ren et al., Recent Advances in Shuttle Effect Inhibition for Lithium Sulfur Batteries, 23 Energy Storage Materials 707, 707-09 (2019).*
Zhang, S. et al., "Recent Advances in Electrolytes for Lithium-Sulfur Batteries," Adv. Energy Mater. 2015, 28 pages.

* cited by examiner

*Primary Examiner* — Ula C Ruddock
*Assistant Examiner* — Frank A Chernow
(74) *Attorney, Agent, or Firm* — Foley & Lardner LLP

(57) ABSTRACT

An electrochemical device includes a cathode including elemental selenium, elemental sulfur, or selenium-sulfur containing composite; a negative electrode; a separator; and an electrolyte including a poly(alkyleneoxide) siloxane; and a salt; wherein a concentration of the salt in the electrolyte is sufficient to minimize dissolution of polysulfides/polyselenides formed during cycling of the device.

20 Claims, 12 Drawing Sheets

POLY(ALKYLENE OXIDE) SILOXANE-BASED ELECTROLYTES FOR RECHARGEABLE BATTERIES

GOVERNMENT RIGHTS

The United States Government has rights in this invention pursuant to Contract No. DE-AC02-06CH11357 between the United States Government and UChicago Argonne, LLC, representing Argonne National Laboratory.

FIELD

Generally, the present invention relates to poly(alkylene oxide) siloxane ("PAOSi") based electrolytes for use in rechargeable batteries. Specifically, the rechargeable batteries include selenium, sulfur, or selenium-sulfur containing cathodes.

SUMMARY

In one aspect, an electrochemical device is provided having a cathode that includes elemental selenium, elemental sulfur, or a selenium-sulfur composite of formula $S_xSe_y$, wherein $0.1<x/y\leq50$; a negative electrode; a separator; and an electrolyte containing a poly(alkyleneoxide) siloxane; and a salt wherein a concentration of the salt in the electrolyte is sufficiently high to prevent or suppress dissolution of polysulfides/polyselenides formed during cycling of the device. In such embodiments, the concentration of the salt in the electrolyte may be from 2 M to 10 M where the molarity (M) is determined as moles of salt divided by the volume of the electrolyte, without considering the volume change of the electrolyte composition due to dissolution of the salt. In any such embodiments, the concentration may be from 2 M to 5 M. In any of the above embodiments, the poly(alkyleneoxide) siloxane may be a compound having at least one poly(alkylene oxide) ("PAO") moiety on a silicon atom. In any of the above embodiments, the device may be a lithium battery or a sodium battery. In any of the above embodiments, the separator may include a sulfonated tetrafluoroethylene-based fluoropolymer-copolymer, a sulfonated poly (ether ether ketone), a polysulfone, a polyethylene, a polypropylene, an ethylene-propylene copolymer, a polyimide, or a polyvinyldifluoride.

DETAILED DESCRIPTION

Figure 1A:
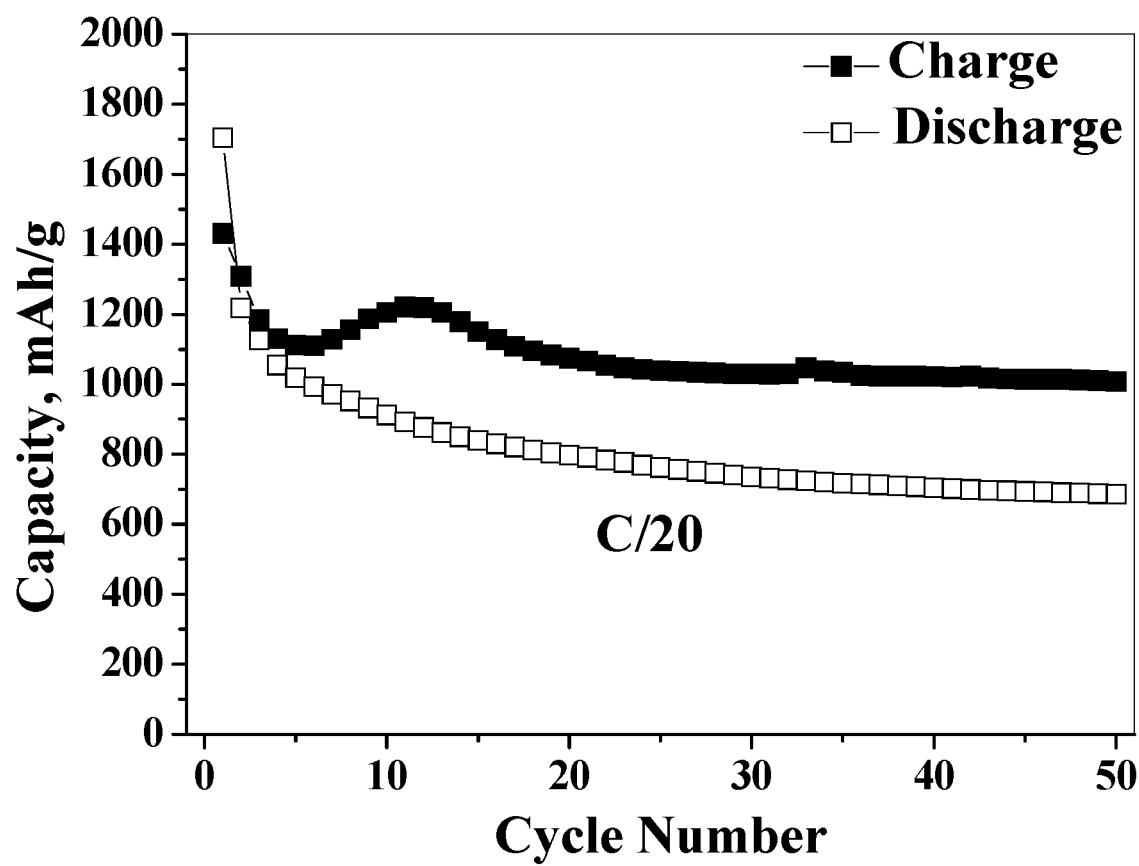
FIGS. 1A, 1B, and 1C illustrate charge/discharge curves, cycle performance, and coulombic efficiency, respectively, for a Li/Se—S cell at C/20 in 1M LiTFSI/DOL-DME (1/1, v/v) with 0.2 M LiNO$_3$, according to Example 1.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the claims presented below) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein, or unless otherwise clearly contradicted by context. The use of any and all examples, or exemplary language (e.g., "such as") provided herein, is intended merely to better illustrate the embodiments and does not pose a limitation on the scope of the claims unless otherwise stated. No language in the specification should be construed as indicating any non-claimed element as essential.

In general, "substituted" refers to an alkyl, alkenyl, alkynyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

As used herein, "alkyl" groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Alkyl groups may be substituted or unsubstituted. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups. Representative substituted alkyl groups may be substituted one or more times with, for example, amino, thio, hydroxy, cyano, alkoxy, and/or halo groups such as F, Cl, Br, and I groups. As used herein the term haloalkyl is an alkyl group having one or more halo groups. In some embodiments, haloalkyl refers to a perhaloalkyl group.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

Alkenyl groups are straight chain, branched or cyclic alkyl groups having 2 to about 20 carbon atoms, and further including at least one double bond. In some embodiments alkenyl groups have from 1 to 12 carbons, or, typically, from 1 to 8 carbon atoms. Alkenyl groups may be substituted or unsubstituted. Alkenyl groups include, for instance, vinyl, propenyl, 2-butenyl, 3-butenyl, isobutenyl, cyclohexenyl, cyclopentenyl, cyclohexadienyl, butadienyl, pentadienyl, and hexadienyl groups among others. Alkenyl groups may be substituted similarly to alkyl groups. Divalent alkenyl groups, i.e., alkenyl groups with two points of attachment, include, but are not limited to, CH—CH=$CH_2$, C=$CH_2$, or C=$CHCH_3$.

As used herein, "aryl" or "aromatic," groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. The phrase "aryl groups" includes groups containing fused rings, such as fused aromatic-aliphatic ring systems (e.g., indanyl, tetrahydronaphthyl, and the like). Aryl groups may be substituted or unsubstituted.

Aralkyl groups are substituted aryl groups in which an alkyl group as defined above has a hydrogen or carbon bond of the alkyl group replaced with a bond to an aryl group as defined above. In some embodiments, aralkyl groups contain 7 to 14 carbon atoms, 7 to 10 carbon atoms, e.g., 7, 8, 9, or 10 carbon atoms or any range therein (e.g., 7-8). Aralkyl groups may be substituted or unsubstituted. Substituted aralkyl groups may be substituted at the alkyl, the aryl or both the alkyl and aryl portions of the group. Representative substituted and unsubstituted alkaryl groups include but are not limited to alkylphenyl such as methylphenyl, (chloromethyl)phenyl, chloro(chloromethyl)phenyl, or fused alkaryl groups such as 5-ethylnaphthalenyl.

Heterocyclyl groups are non-aromatic ring compounds containing 3 or more ring members, of which one or more is a heteroatom such as, but not limited to, N, O, and S. In some embodiments, the heterocyclyl group contains 1, 2, 3 or 4 heteroatoms. In some embodiments, heterocyclyl groups include mono-, bi- and tricyclic rings having 3 to 16 ring members, whereas other such groups have 3 to 6, 3 to 10, 3 to 12, or 3 to 14 ring members. Heterocyclyl groups encompass partially unsaturated and saturated ring systems, such as, for example, imidazolinyl and imidazolidinyl groups. The phrase also includes bridged polycyclic ring systems containing a heteroatom such as, but not limited to, quinuclidyl. The phrase also includes heterocyclyl groups that have other groups, such as alkyl, oxo or halo groups, bonded to one of the ring members, referred to as "substituted heterocyclyl groups". Heterocyclyl groups include, but are not limited to, aziridinyl, azetidinyl, pyrrolidinyl, imidazolidinyl, pyrazolidinyl, thiazolidinyl, tetrahydrothiophenyl, tetrahydrofuranyl, dioxolyl, pyrrolinyl, piperidyl, piperazinyl, morpholinyl, thiomorpholinyl, tetrahydropyranyl, and tetrahydrothiopyranyl groups. Representative substituted heterocyclyl groups may be mono-substituted or substituted more than once, such as, but not limited to, morpholinyl groups, which are 2-, 3-, 4-, 5-, or 6-substituted, or disubstituted with various substituents such as those listed above. The heteroatom(s) may also be in oxidized form, if chemically possible.

The term "halogen" or "halo" as used herein refers to bromine, chlorine, fluorine, or iodine. In some embodiments, the halogen is fluorine. In other embodiments, the halogen is chlorine or bromine. The term "halide" as used herein refers to the anion of a halogen, such as bromide, chloride, fluoride, and iodide. In some embodiments, the halide is chloride or iodide.

The term "alkoxy" refers to a substituted or unsubstituted alkyl group bonded to an oxygen atom. Examples include but are not limited to methoxy and ethoxy. Representative substituted alkoxy groups may be substituted one or more times with substituents such as those listed above, such as methoxymethyl and fluoromethoxy.

The electrochemical devices described herein include a cathode (i.e. positive electrode) that includes elemental selenium, elemental sulfur, or a selenium-sulfur composite of formula $S_xSe_y$, where $0.1<x/y<50$, in an electrolyte that includes a poly(alkyleneoxide) siloxane and a salt. In the electrolyte, the salt has a sufficiently high concentration to minimize or suppress the dissolution of soluble polysulfides and/or polyselenides that are formed during repeated charge/discharge of the device. It has been found that if the polysulfides and/or polyselenides are dissolved into the electrolyte, degradation occurs and the devices are more readily susceptible to failure. However, the present systems/devices with the higher salt content in the electrolyte prevent the dissolution of the polysulfides and/or polyselenides leading to stabilization of the device and improved performance. The system provides a result that is unexpected because the solvation between cations or anions and solvents will be significantly enhanced if the salt concentration is increased to some extent, which would decrease the interaction between polysulfides or polyselenides and the electrolytes. Meanwhile, the solvents in the present systems can further suppress the interaction between solvated anions and polysulfides or polyselenides.

The salt to be used in the electrolyte is not particularly limited, as long as it dissolves in the poly(ethyleneoxide) siloxane and serves as an electrolyte for an electrochemical device, while preventing, or at least suppressing, the dissolution of polysulfides and/or polyselenides into the electrolyte. In some embodiments, the salt is an alkali metal salt such as a lithium salt, where the device is a lithium battery, or a sodium salt, where the device is a sodium battery. Illustrative salts, suited for use in a poly(ethyleneoxide)

siloxane electrolyte of a lithium battery, include, but are not limited to, LiClO$_4$, LiPF$_6$, LiAsF$_6$, LiBF$_4$, LiB(C$_2$O$_4$)$_2$ ("LiBOB"), LiBF$_2$(C$_2$O$_4$) ("LiODFB"), LiCF$_3$SO$_3$, LiN(SO$_2$F)$_2$ ("LiFSI"), LiPF$_3$(C$_2$F$_5$)$_3$ ("LiFAP"), LiPF$_4$(CF$_3$)$_2$, LiPF$_3$(CF$_3$)$_3$, LiN(SO$_2$CF$_3$), LiCF$_3$CO$_2$, LiC$_2$F$_5$CO$_2$, LiPF$_2$(C$_2$O$_4$)$_2$, LiPF$_4$C$_2$O$_4$, LiN(CF$_3$SO$_2$)$_2$, LiC(CF$_3$SO$_2$)$_3$, LiN(SO$_2$C$_2$F$_5$)$_2$, lithium alkyl fluorophosphates, Li(C$_2$O$_4$)$_2$, LiBF$_2$C$_2$O$_4$, Li$_2$B$_{12}$X$_{12-y}$H$_y$, Li$_2$B$_{10}$X$_{10-y'}$H$_{y'}$, or mixtures of any two or more such salts. In the foregoing, y is from 1-12 and y' is from 1 to 10. In embodiments where the device is a sodium battery, illustrative salts include, but are not limited to, NaClO$_4$, NaPF$_6$, NaAsF$_6$, NaSbF$_6$, NaAlCl$_4$, NaBF$_4$, NaCF$_3$SO$_3$, NaN(SO$_2$CF$_3$)$_2$, Na[B(C$_2$O$_4$)$_2$] ("NaBOB"), or a mixture of any two or more such sodium salts.

The concentration of the salt in the electrolyte described above may be, in any of the embodiments, greater than 2 M, greater than 3 M, or greater than 4 M in the electrolyte, where the molarity, M, is measured by moles of salt divided by the volume of the solvent without considering the volume change of the electrolyte composition after dissolving the salt. This concentration range include sub-ranges such as from about 2 M to about 10 M, about 2 M to about 9.5 M, about 2 M to about 8 M, about 2 M to about 7.5 M, about 2 M to about 7 M, about 2 M to about 6.5 M, about 2 M to about 6 M, about 2 M to about 5.5 M, about 2 M to about 5 M, about 2 M to about 4.5 M, about 2 M to about 4 M, about 2 M to about 3.5 M, about 2 M to about 3 M, or about 2 M to about 2.5 M. In some embodiments, the salt is present in the electrolyte at a concentration of about 2.5 M to about 10 M. This includes concentrations from about 2.5 M to about 9.5 M, about 2.5 M to about 9 M, about 2.5 M to about 2.5 M, about 2.5 M to about 8 M, about 2.5 M to about 7.5 M, about 2.5 M to about 7 M, about 2.5 M to about 6.5 M, about 2.5 M to about 6 M, about 2.5 M to about 5.5 M, about 2.5 M to about 5 M, about 2.5 M to about 4.5 M, about 2.5 M to about 4 M, about 2.5 M to about 3.5 M, or about 2.5 M to about 3 M. This includes concentrations from about 4 M to about 10 M, about 4 M to about 9 M, about 4 M to about 8 M, about 5 M to about 10 M, about 5 M to about 9 M, about 5 M to about 8 M, about 6 M to about 10 M, about 6 M to about 9 M, or about 6 M to about 8 M. In some embodiments, the salt is present in the electrolyte at a concentration of about 2.0 M, 2.5 M, 3.0 M, 3.5 M, 4.0 M, 4.5 M, 5.0 M, 5.5 M, 6.0 M, 6.5 M, 7.0 M, 7.5 M, 8.0 M, 8.5 M, 9.0 M, 9.5 M, or 10.0 M, including increments therein.

The poly(alkylene oxide) siloxanes ("PAO-siloxanes") include siloxanes having at least one poly(alkylene oxide) ("PAO") moiety on a silicon atom. In some embodiments, the poly(alkylene oxide) solvent is a compound of Formula I:

In Formula I, x is 1, 2, or 3 and each R$^1$ is independently hydrogen, a substituted or unsubstituted alkyl group having from 1 to 12 carbon atoms, a substituted or unsubstituted alkenyl group having from 2 to 12 carbon atoms, or a further siloxane group of Formula II:

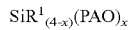

In Formula II, each R$^2$ is independently hydrogen, a substituted or unsubstituted alkyl group having from 1 to 12 carbon atoms, a substituted or unsubstituted alkenyl group having from 2 to 12 carbon atoms, or a further siloxane group of formula —OSiR$^2_{(2-x')}$(PAO)$_{x'}$, and x' is 0, 1, 2, or 3. It will be understand that R$^1$ and/or R$^2$ may repeatedly be a further siloxane group, resulting in a polymeric siloxane.

Such selection of x, x', R$^1$, and R$^2$ will be readily understood and determined by the person of ordinary skill in the art to form and terminate a polysiloxane. As used in any formula herein, a PAO may be a group of Formula III:

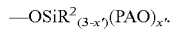

In Formula III, R$^3$ is H, alkyl, or a group of Formula IV

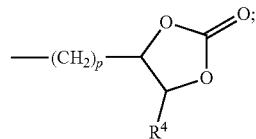

n is an integer from 1 to 12; p is an integer from 0 to 12; q merely represents a polymeric repeat unit; q' is 0 or 1; and R$^4$ is H, alkyl, or alkenyl. Illustrative values of q may be from 1 to 1000. In some embodiments, this includes q being from 1 to 500, from 1 to 100, from 1 to 50, or from 1 to 10. In some embodiments, R$^3$ is H or a C$_1$-C$_{12}$ alkyl. In other embodiments, R$^3$ is methyl, ethyl, or propyl. In some embodiments, n is 1, 2, or 3. In some embodiments, p is 0, 1, 2, or 3. In any of the above embodiments, R$^4$ is H, C$_1$-C$_{10}$ alkyl, or C$_1$-C$_{10}$ alkenyl. In any of the above embodiments, q may be 1, 2, 3, 4, 5, 6, 7, 8, 9, or 10.

In some embodiments, the PAO is a poly(ethylene oxide) or poly(propylene oxide) group. As a non-limiting example, the PAO may be a group of Formula III, where n is 2 or 3; p is 0, 1, 2, or 3; R$^3$ is H, methyl, ethyl, propyl, or a group of Formula IV; and q is 1, 2, 3, 4, 5, 6, 7, 8, 9, or 10; and where R$^3$ is a group of Formula IV, R$^4$ is H, methyl, ethyl, or propyl.

Illustrative poly(ethyleneoxide) siloxanes include, but are not limited to (CH$_3$)$_3$SiO(CH$_2$CH$_2$O)$_n$CH$_3$, (CH$_3$)$_3$SiCH$_2$O(CH$_2$CH$_2$O)$_n$CH$_3$, Si[O(CH$_2$CH$_2$O)$_p$CH$_3$]$_4$, (CH$_3$)$_3$Si(CH$_2$)$_3$O(CH$_2$CH$_2$O)$_n$CH$_3$, (CH$_3$)$_2$Si[O(CH$_2$CH$_2$O)$_{n'}$CH$_3$]$_2$, CH$_3$SiOR$^3$, CH$_3$Si[O(CH$_2$CH$_2$O)$_p$CH$_3$]$_3$, (CH$_3$)$_2$Si[O(CH$_2$CH$_2$O)$_n$CH$_3$][(CH$_2$)$_3$—O—(CH$_2$CH$_2$O)$_n$CH$_3$], (CH$_3$)$_3$Si(CH$_2$)$_3$OR$^3$, CH$_3$O(CH$_2$CH$_2$O)$_n$SiO(CH$_3$)$_2$O(CH$_3$)$_2$SiO(CH$_2$CH$_2$O)$_n$CH$_3$, CH$_3$O(CH$_2$CH$_2$O)$_n$Si(CH$_3$)$_2$O(CH$_3$)$_2$SiO(CH$_2$CH$_2$O)$_n$CH$_3$, CH$_3$O(CH$_2$CH$_2$O)$_n$(CH$_2$)$_3$Si(CH$_3$)$_2$O(CH$_3$)$_2$SiCH$_2$O(CH$_2$CH$_2$O)$_n$CH$_3$, CH$_3$O(CH$_2$CH$_2$O)$_n$(CH$_2$)$_3$Si(CH$_3$)$_2$O(CH$_3$)$_2$Si(CH$_2$)$_3$O(CH$_2$CH$_2$O)$_n$CH$_3$, (CH$_3$)$_3$SiO(CH$_3$)$_2$Si(CH$_2$)$_3$O(CH$_2$CH$_2$O)$_n$CH$_3$, (CH$_3$)$_3$SiO(CH$_3$)$_2$Si(CH$_2$)$_2$O(CH$_2$CH$_2$O)$_n$CH$_3$, (CH$_3$)$_3$SiO(CH$_3$)$_2$SiO(CH$_2$CH$_2$O)$_n$CH$_3$, (CH$_3$)$_3$SiO(CH$_3$)$_2$SiOR$^3$, R$^3$OSi(CH$_3$)$_2$O(CH$_3$)$_2$SiOR$^3$, (CH$_3$)$_3$SiO(CH$_3$)$_2$Si(CH$_2$)$_3$OR$^3$, R$^3$O(CH$_2$)$_3$Si(CH$_3$)$_2$O(CH$_3$)$_2$Si(CH$_2$)$_3$OR$^3$, CH$_3$O(CH$_2$CH$_2$O)$_n$Si(CH$_3$)$_2$OSi(CH$_3$)$_2$O(CH$_3$)$_2$SiO(CH$_2$CH$_2$O)$_n$CH$_3$, CH$_3$O(CH$_2$CH$_2$O)$_{n'}$(CH$_2$)$_3$Si(CH$_3$)$_2$OSi(CH$_3$)$_2$O(CH$_3$)$_2$Si(CH$_2$)$_3$O(CH$_3$)$_2$SiO(CH$_2$CH$_2$O)$_n$CH$_3$, [(CH$_3$)$_3$SiO]$_2$Si(CH$_3$)O(CH$_2$CH$_2$O)$_n$CH$_3$, [(CH$_3$)$_3$SiO]$_2$Si(CH$_3$)(CH$_2$)$_3$O(CH$_2$CH$_2$O)$_n$CH$_3$, [(CH$_3$)$_3$SiO]$_2$Si(CH$_3$)O(CH$_2$CH$_2$O)$_n$CH$_3$Si[OSi(CH$_3$)$_3$]$_2$, R$^3$OSi(CH$_3$)$_2$OSi(CH$_3$)$_2$O(CH$_3$)$_2$SiOR$^3$, R$^3$OSi(CH$_3$)$_2$OSi(CH$_3$)$_2$OSi(CH$_3$)$_3$, R$^3$O(CH$_2$)$_3$Si(CH$_3$)$_2$OSi(CH$_3$)$_2$O(CH$_3$)$_2$Si(CH$_2$)$_3$OR$^3$, R$^3$O(CH$_2$)$_3$Si(CH$_3$)$_2$OSi(CH$_3$)$_2$OSi(CH$_3$)$_3$, R$^3$OSi(CH$_3$)$_2$OSi(CH$_3$)$_2$O(CH$_3$)$_2$SiO(CH$_2$CH$_2$O)$_n$CH$_3$, R$^3$O(CH$_2$)$_3$Si(CH$_3$)$_2$OSi(CH$_3$)$_2$O(CH$_3$)$_2$Si(CH$_2$)$_3$O(CH$_2$CH$_2$)$_n$CH$_3$, or a mixture of any two or more such poly(ethyleneoxide) siloxanes. In the above poly(ethyleneoxide) siloxanes R$^3$ is a carbonate group of Formula IV; n is 2, 3, 4, 5, 6, or 7, n' is 2, 3, 4, or 5; p is 2, 3, or 4; and p' is 2 or 3. In some embodiments, the poly(ethyleneoxide) siloxane is 2,2-dimethyl-3,6,9-trioxa-2-siladecane (CH$_3$(CH$_2$CH$_2$O)$_2$OSi(CH$_3$)$_3$).

Illustrative poly(ethyleneoxide) siloxanes include, but are not limited to 2,2,4,4-tetramethyl-3,6,9-trioxa-2-siladecane; 2-dimethyl-4,7,10,13-tetraoxa-2-silatetradecane; 2,4,7-trioxa-8-siladecane; 2,2-dimethyl-1-phenyl-3,6,9-trioxa-2-siladecane; 2,2-dimethyl-3,6,9-trioxa-2-poly(ethyleneoxide) siladecane; 2,2-dimethyl-3,6,9,12-tetraoxa-2-silatridecane; (5R)-5,8,8,9,9-pentamethyl-[3-(phenylsulfonyl)propyl]-2,4,7-trioxa-8-siladecane; 1-[1-trimethylsiloxanylethyl]ethylene carbonate ("1NMC") or a mixture of any two or more such siloxanes. In some embodiments, the poly(ethyleneoxide) siloxane is 2,2-dimethyl-3,6,9-trioxa-2-siladecane ($CH_3$($OCH_2CH_2$)$_2$Si($CH_3$)$_3$. Illustrative structures of siloxanes containing a group of Formula IV include:

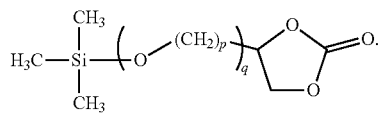

In Formula IV, where p is 2 and q is 1, the compound represented thereby may be referred to as "1NMC."

Non-poly(ethyleneoxide) siloxanes may also be used as co-solvents in the electrolytes. Illustrative co-solvents include, but are not limited to ethylene carbonate, dimethyl carbonate, ethyl methyl carbonate, diethyl carbonate, propylene carbonate, fluorinated carbonate, or a mixture of any two or more thereof. In some embodiments, the co-solvents are ether-based solvents. Illustrative ether-based co-solvents include, but are not limited to 1,3-dioxolane ("DOL"), dimethoxyethane ("DME"), tetrahydrofuran, di(ethylene glycol) dimethyl ether, tri(ethylene glycol) dimethyl ether, diglyme (DGM), partly silanized ether, tetra(elene glycol) dimethyl ether ("TEGDME"), poly (ethylene glycol) dimethyl ether (PEGDME), 1,4-dioxane, or a mixture of any two or more thereof. In some embodiments, the co-solvents are fluorinated ether-based solvents. Illustrative fluorinated ether-based co-solvents include, but are not limited to 1,1,2,2-tetrafluoroethyl-2,2,3,3-tetrafluoropropyl ether; 1,1,2,2-tetrafluoroethyl-2,2,3,3,3-pentafluoropropyl ether; 2,2,2-trisfluoroethyl-1,1,2,3,3,3-hexafluoropropyl ether; ethyl-1,1,2,3,3,3-hexafluoropropyl ether; difluoromethyl-2,2,3,3,3-pentafluoropropyl ether; difluoromethyl-2,2,3,3-tetrafluoropropyl ether; 2-fluoro-1,3-dioxolane; 2,2-difluoro-1,3-dioxolane; 2-trifluoromethyl-1,3-dioxolane; 2,2-bis(trifluoromethyl)-1,3-dioxolane; 4-fluoro-1,3-dioxolane; 4,5-difluoro-1,3-dioxolane, or a mixture of any two or more. In some embodiments, the co-solvents may be carbonated-based solvents, ether-based solvents, fluorinated ether-based solvents, dimethyl sulfoxide, sulfone, ionic liquids, or a mixture of any two or more thereof. In some embodiments, the co-solvent is 1,1,2,2-tetrafluoroethyl-2,2,3,3-tetrafluoropropyl ether. In some embodiments, the co-solvent is DOL.

When used, the co-solvent may be present from about 0.1 vol % to about 80 vol %, wherein the vol % is calculated on the total volume of the at least one poly(ethyleneoxide) siloxane and co-solvents. For example, the content of the co-solvent may be from about 1 vol % to about 70 vol %, from about 2 vol % to about 60 vol %, from about 3 vol % to about 50 vol %, or from about 4 vol % to about 40 vol %.

The electrochemical device may also include an anion receptor to improve the battery cycle life. Representative anion receptors include, but are not limited to, tri(propyl) borate, tris(1,1,1,3,3,3-hexafluoro-propan-2-yl)borate, tris (1,1,1,3,3,3-hexafluoro-2-phenyl-propan-2-yl)borate, tris(1, 1,1,3,3,3-hexafluoro-2-(trifluoromethyl)propan-2-yl)borate, triphenyl borate, tris(4-fluorophenyl)borate, tris(2,4-difluorophenyl)borate, tris(2,3,5,6-tetrafluorophenyl)borate, tris (pentafluorophenyl)borate, tris(3-(trifluoromethyl)phenyl) borate, tris(3,5-bis(trifluoromethyl)phenyl)borate, tris (pentafluorophenyl)borane, 2-(2,4-difluorophenyl)-4-fluoro-1,3,2-benzodioxaborole, 2-(3-trifluoromethyl phenyl)-4-fluoro-1,3,2-benzodioxaborole, 2,5-bis(trifluoromethyl)phenyl-4-fluoro-1,3,2-benzodioxaborole, 2-(4-fluorophenyl)-tetrafluoro-1,3,2-benzodioxaborole, 2-(2,4-difluorophenyl)-tetrafluoro-1,3,2-benzodioxaborole, 2-(pentafluorophenyl)-tetrafluoro-1,3,2-benzodioxaborole, 2-(2-trifluoromethyl phenyl)-tetrafluoro-1,3,2-benzodioxaborole, 2,5-bis(trifluoromethyl phenyl)-tetrafluoro-1,3,2-benzodioxaborole, 2-phenyl-4,4,5,5-tetra(trifluoromethyl)-1,3,2-benzodioxaborolane, 2-(3,5-difluorophenyl-4,4,5,5-tetrakis(trifluoromethyl)-1,3,2-dioxaborolane, 2-(3,5-difluorophenyl-4,4,5,5-tetrakis(trifluoromethyl)-1,3,2-dioxaborolane, 2-pentafluorophenyl-4,4,5,5-tetrakis (trifluoromethyl)-1,3,2-dioxaborolane, bis(1,1,1,3,3,3-hexafluoroisopropyl)phenyl-boronate, bis(1,1,1,3,3,3-hexafluoroisopropyl)-3,5-difluorophenylboronate, bis(1,1,1,3,3,3-hexafluoroisopropyl) pentafluorophenylboronate, or a mixture of any two or more such anion receptors. In such embodiments, each anion receptor may present at a concentration of about 0.001 to about 10 wt %.

The electrochemical device may further include stabilizing additives to extend the cycle life and suppress the shuttle effect. Illustrative stabilizing additives include, but are not limited to N—O compounds, polysulfides, phosphorus pentasulfide, or a mixture of any two or more thereof. It should be noted that polysulfides in controlled amounts may be added as the stabilizing additive, but the uncontrolled dissolution of polysulfides from the electrode is not desirable. Illustrative N—O compounds include, but are not limited to inorganic nitrates, organic nitrates, inorganic nitrites, organic nitrites, organic nitro compounds, and other organic N—O compounds. In such embodiments, the stabilizing additives may be present at a concentration of about 0.001 to about 10 wt %.

As noted above, the cathode may include elemental selenium, elemental sulfur, or a selenium-sulfur composite. The elemental selenium, elemental sulfur, or a selenium-sulfur composite may be dispersed on the surface of, or within pores of, a conductive carbon matrix. Illustrative conductive carbon matrices include, but are not limited to, graphite, graphene, expanded graphite, reduced graphene oxide, Black Pearls® 2000, Ketjenblack®, acetylene black, carbon black, metal-organic framework (e.g., a porous, ordered organic-inorganic composite material), porous organic polymer, porous carbon, carbon spheres, carbon aerogel, single-walled carbon nanotubes, multi-walled carbon nanotubes, carbon nanofibers, carbon nanotube arrays, polypyrrole, polyaniline, and mixtures of any two or more such materials. Black Pearls® 2000 and Ketjenblack® are commercially available forms of carbon black. In some embodiments, the conductive carbon matrix includes a mixture of any one or more of graphite, graphene, expanded graphite, reduced graphene oxide, Black Pearls® 2000, Ketjenblack®, acetylene black, carbon black, metal-organic framework (e.g., a porous, ordered organic-inorganic composite material), porous organic polymer, porous carbon, carbon spheres, carbon aerogel, single-walled carbon nanotubes, multi-walled carbon nanotubes, carbon nanofibers, carbon nanotube arrays, polypyrrole, and polyaniline.

The devices also include a negative electrode and may include a separator. As noted above, where the battery is a lithium ion battery, the negative electrode is lithium metal, and where the battery is a sodium ion battery, the negative electrode is sodium metal. The separators are generally porous materials that allow for the movement of ions through the device. Illustrative separators include, but are not limited to, Whatman™ type microfiber filters (available from, NAFION® type ion exchange membranes (sulfonated tetrafluoroethylene-based fluoropolymer-copolymers), other porous polymeric materials such as, for example, sulfonated poly(ether ether ketones), polysulfones, polyethylene, polypropylene, ethylene-propylene copolymers, polyimides, polyvinyldifluorides, and the like, which may be in the form of membranes, matrix-supported gels, sheets, films, or panels. Other suitable separator materials include porous ceramics, porous insulated metals, cation-conducting glasses, and zeolites.

The positive and negative electrodes (cathodes and anodes, respectively) may also include a binder to hold the electroactive materials in the electrode together and to a current collector. Illustrative binders include, but are not limited to, polyvinylidene difluoride (PVDF), poly(acrylic acid) (PAA), lithiated PAA, polyimide (PI), polyacrylonitrile (PAN), styrene-butadiene rubber (SBR), carboxymethyl cellulose (CMC), and combinations of any two or more thereof. Illustrative current collectors, when used, include, but are not limited to, copper, stainless steel, titanium, tantalum, platinum, gold, aluminum, nickel, cobalt-nickel alloys, highly alloyed ferritic stainless steel containing molybdenum and chromium; or nickel-, chromium-, or molybdenum-containing alloys. The current collector may be a foil, mesh, or screen.

The present invention, thus generally described, will be understood more readily by reference to the following examples, which are provided by way of illustration and are not intended to be limiting of the present invention.

EXAMPLES

Example 1

Figure 1B:
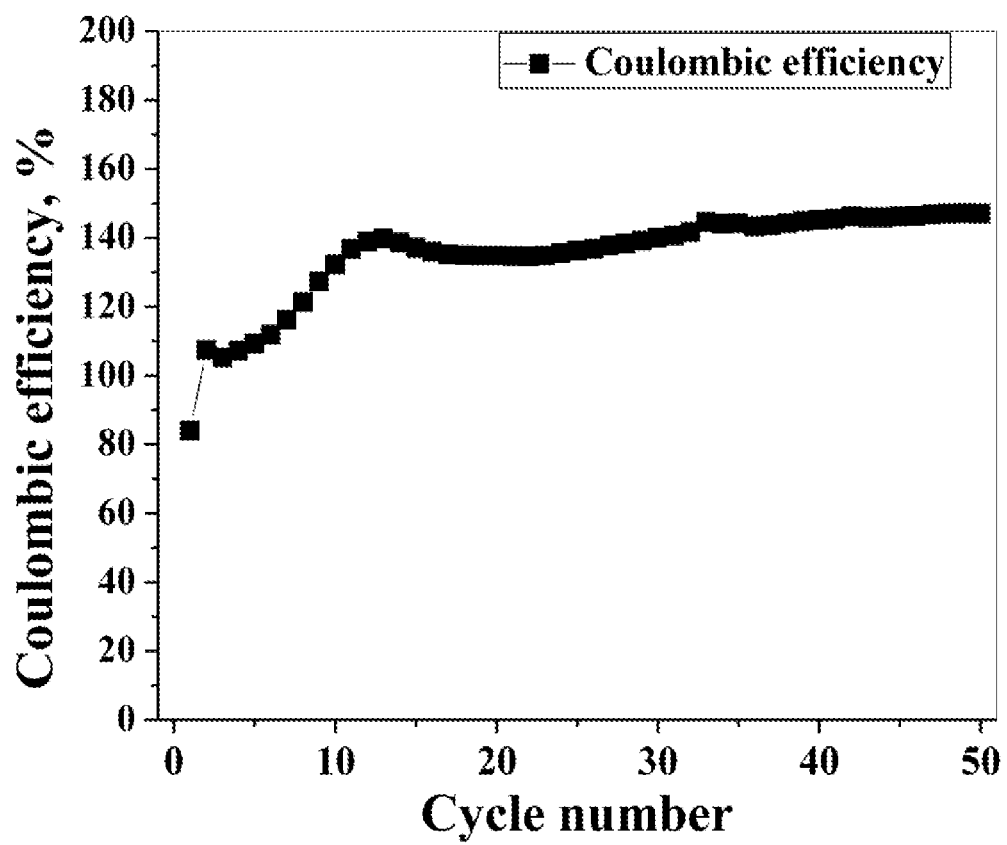
Figure 1C:
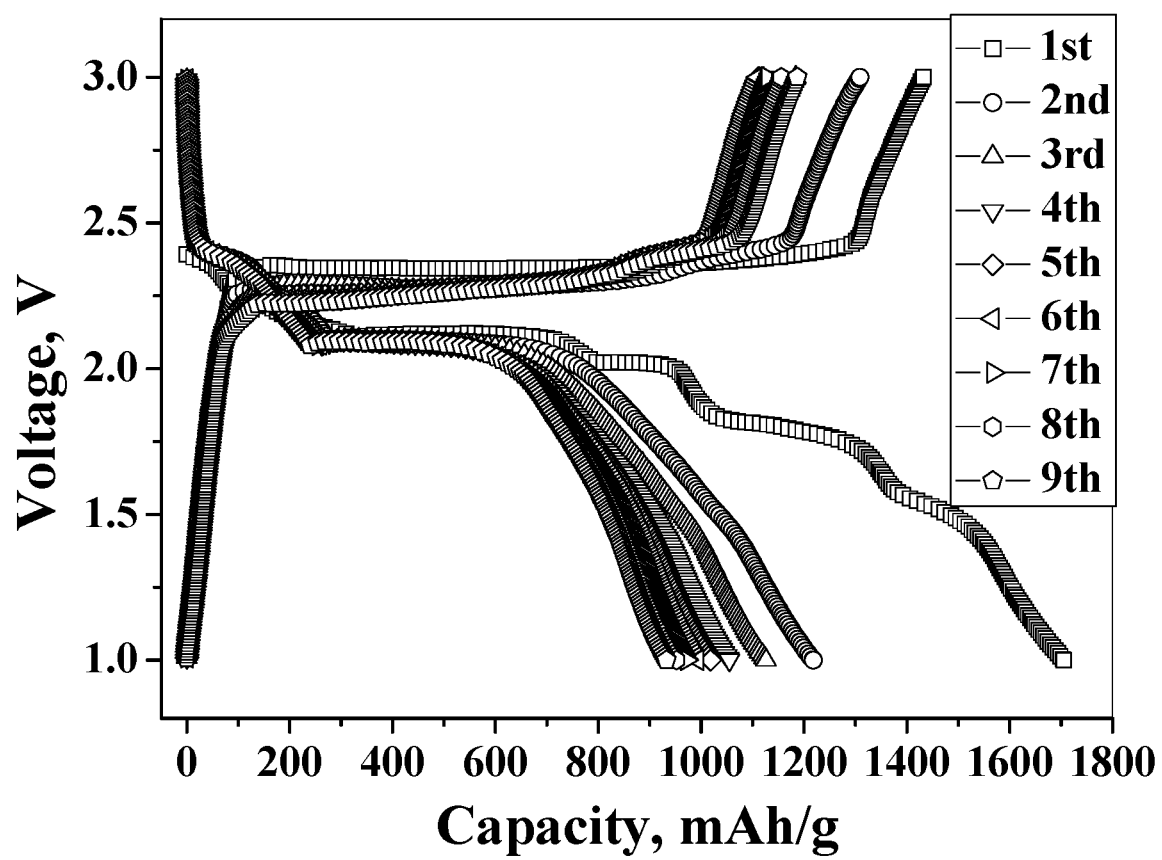

FIGS. 1A, 1B, and 1C illustrate charge/discharge curves, cycle performance, and coulombic efficiency, respectively for a Li/Se—S cell at C/20 using 1M LiTFSI/(DOL and DME) (v/v, 1/1)+0.2 M LiNO$_3$, which is the general used electrolytes for Li/S and Li/Se battery. The Li/Se—S cell is composed of a Li anode, a separator, and a Se—S/C cathode. The content of Se—S in the Se—S/C cathode is about 45 wt. %. As can be seen, even with LiNO$_3$ additive that can help to protect the Li anode, the Li/Se—S cell still shows a continuous capacity fading over 50 cycles. There is a substantial gap between charge capacities and discharge capacities, indicating a severe shuttling effect occurring in the cell. Further, the coulombic efficiency is quite poor. Li$_2$S$_6$ has very high solubility in the DOL and DME.

Example 2

Figure 2A:
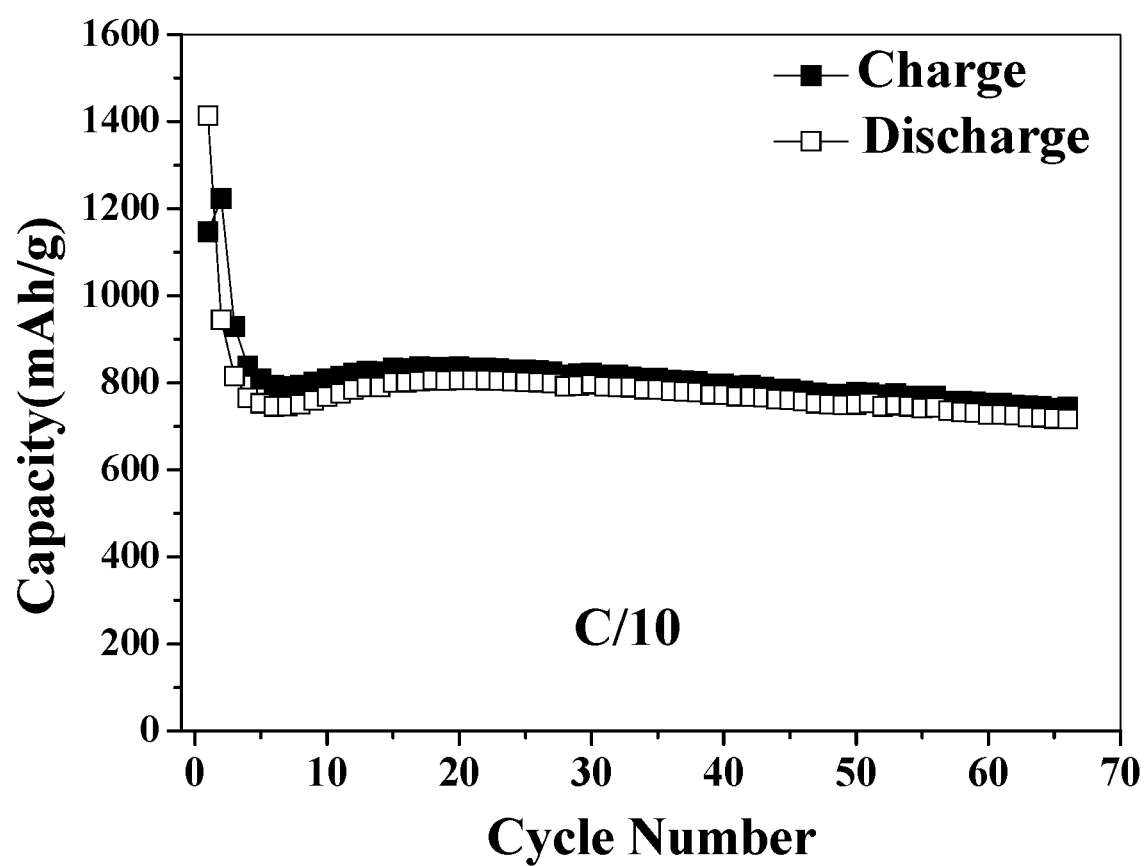
FIGS. 2A, 2B, and 2C illustrate charge/discharge curves, cycle performance, and coulombic efficiency, respectively, for a Li/Se—S cell at C/10 in 2 M LiTFSI/1NM2, according to Example 2.
Figure 2B:
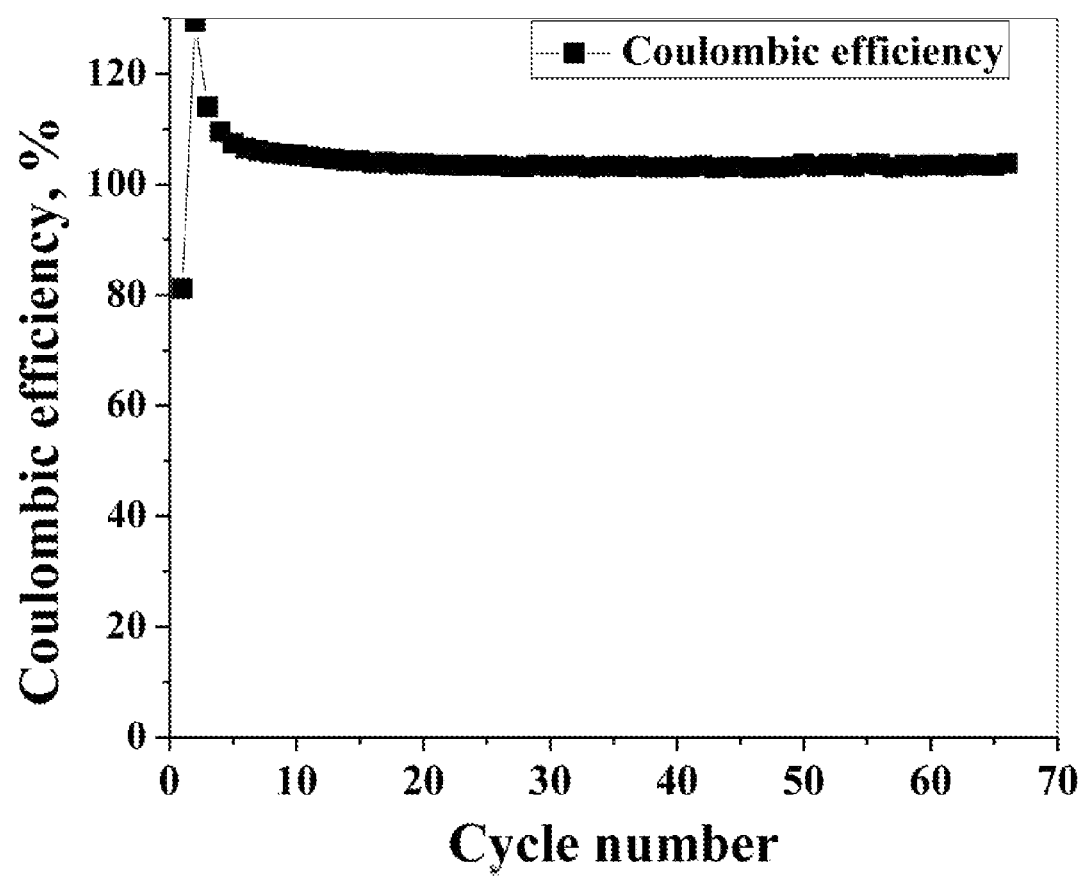
Figure 2C:
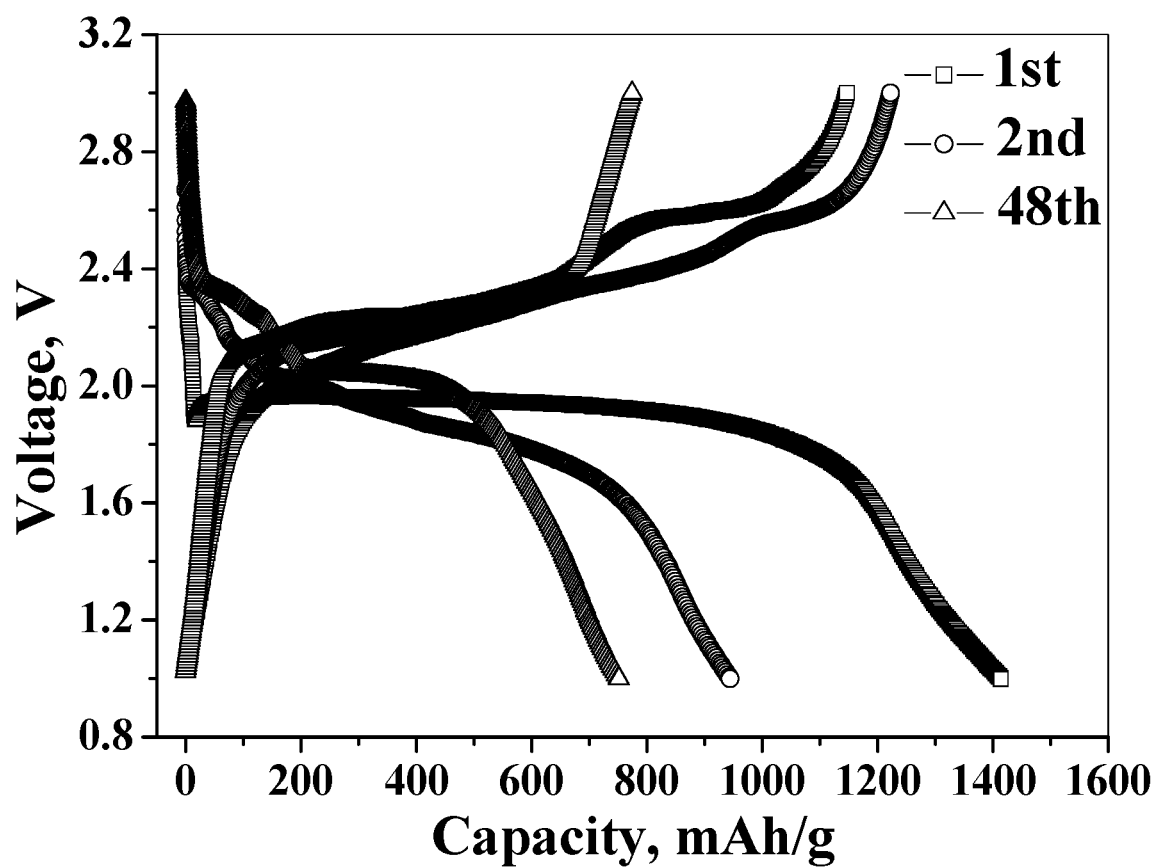

FIGS. 2A, 2B, and 2C illustrate charge/discharge curves, cycle performance, and coulombic efficiency, respectively, for a Li/Se—S cell at C/10 using 2 M LiTFSI/1NM2. The Li/Se—S cell maintains a stable capacity of over 700 mAh/g after the initial 3 cycles. And, it can be also seen that the coulombic efficiency after the first 3 cycles is close to 100%, indicating a diminished shuttle effect.

Example 3

Figure 3A:
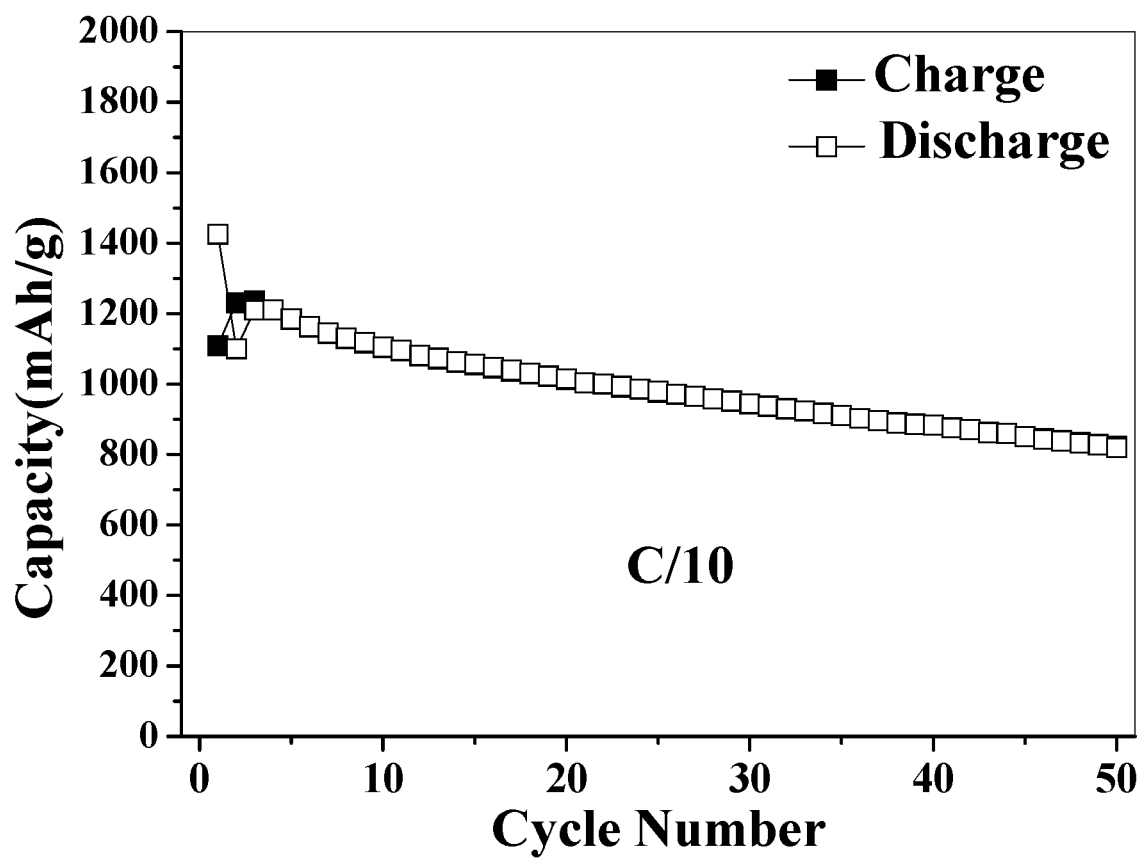
FIGS. 3A, 3B, and 3C illustrate charge/discharge curves, cycle performance, and coulombic efficiency, respectively, for a Li/Se—S cell at C/10 in 5M LiTFSI/DOL+1NM2 (1/1, v/v), according to Example 3.
Figure 3B:
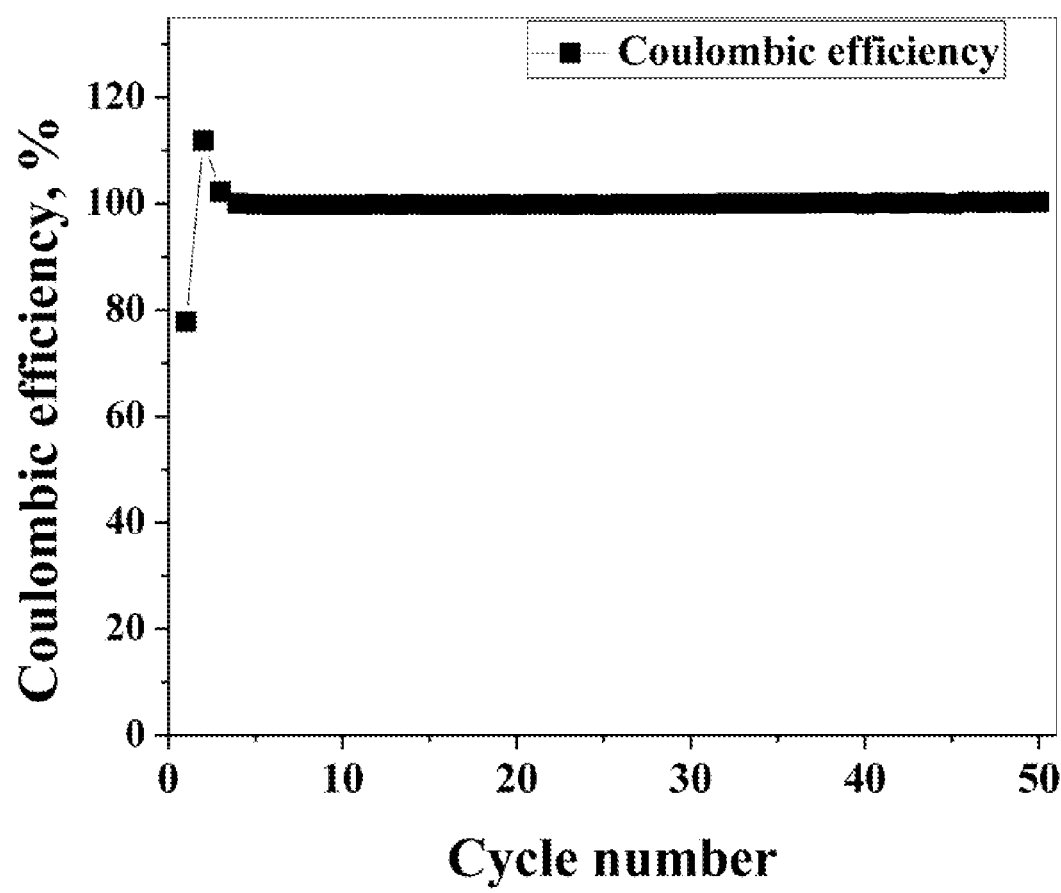
Figure 3C:
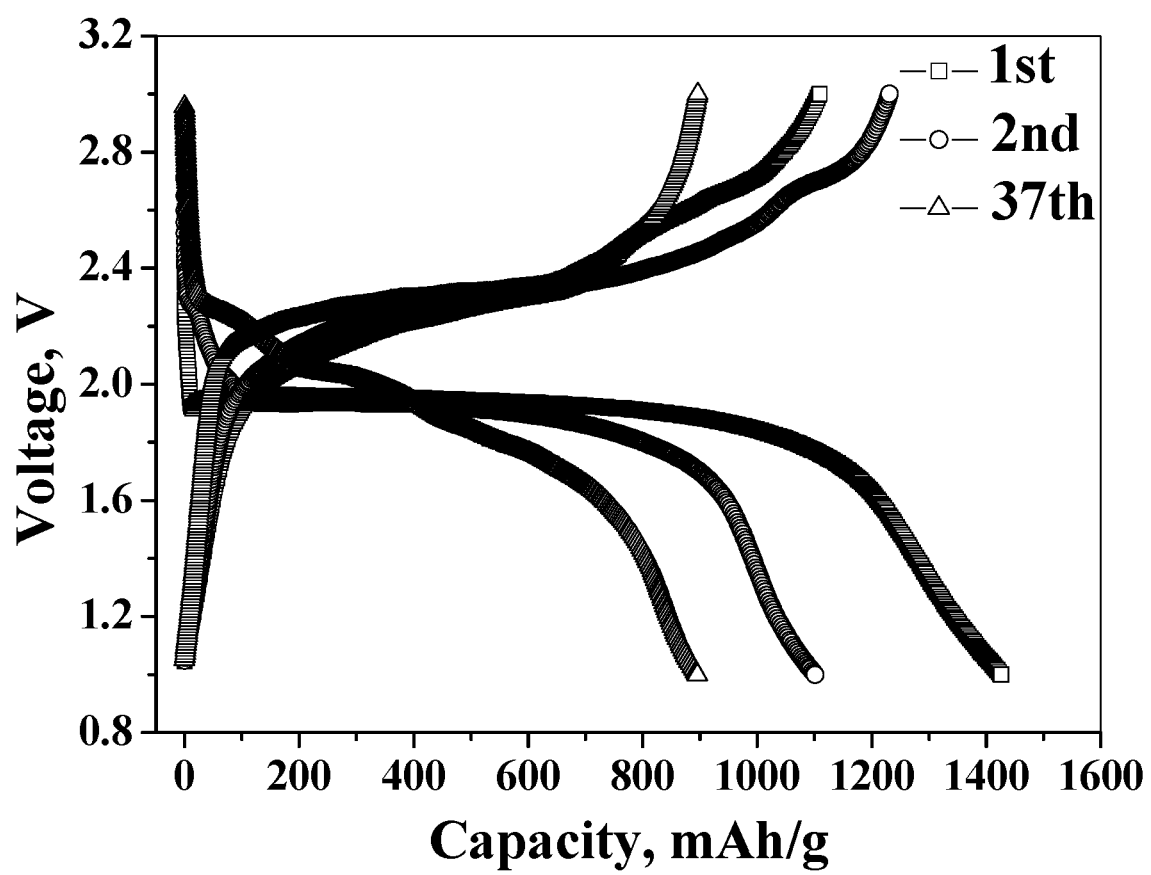

FIGS. 3A, 3B, and 3C illustrate charge/discharge curves, cycle performance, and coulombic efficiency, respectively for a Li/Se—S cell at C/10 using 5 M LiTFSI/(DOL and 1NM2) (1/1, v/v). As shown, with a co-solvent (i.e. DOL), the reversible capacity of the Li/Se—S cell was increased to over 1000 mAh/g. After 50 cycles of charge/discharge, the cell maintains a reversible capacity of over 800 mAh/g. The charge/discharge capacities after the first 3 cycles almost overlapped and the coulombic efficiency is almost 100%, demonstrating improved cycle performance and significantly suppressed shuttling effect. This is because the high concentration electrolyte (5 M LiTFSI/DOL+1NM2 (1/1, v/v)) can suppress the dissolution of polysulfides, which leads to significantly improved electrochemical performance.

Example 4

Figure 4A:
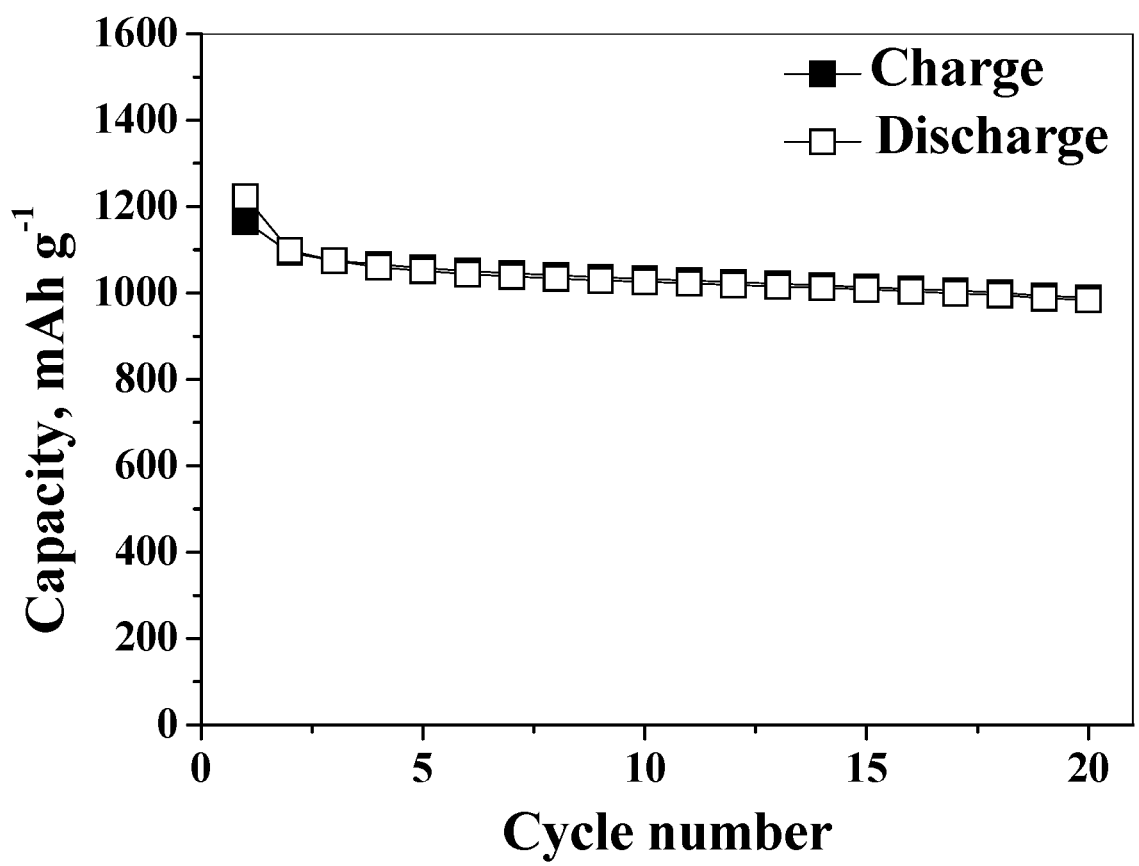
FIGS. 4A, 4B, and 4C illustrate charge/discharge curves, cycle performance, and coulombic efficiency, respectively, for a Li/S cell at C/10 in 5M LiTFSI/DOL+1NM2 (1/1, v/v), according to Example 4.
Figure 4B:
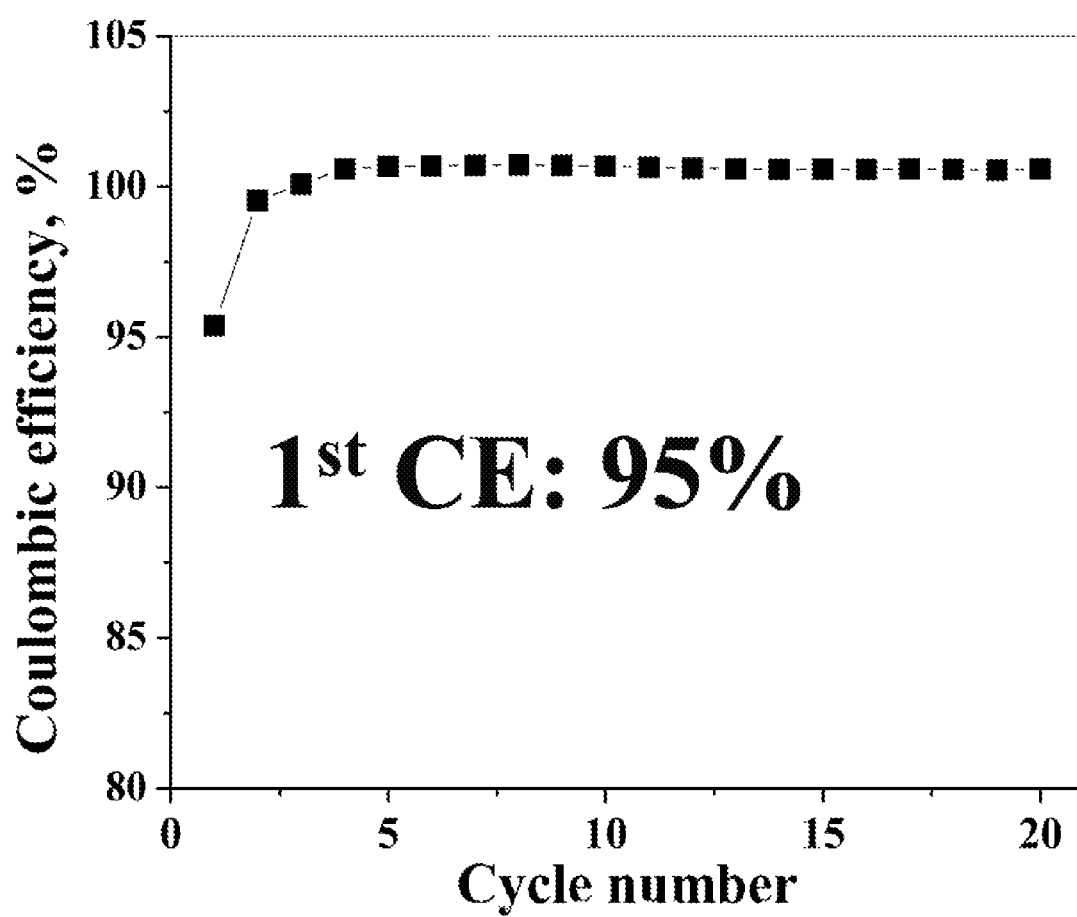
Figure 4C:
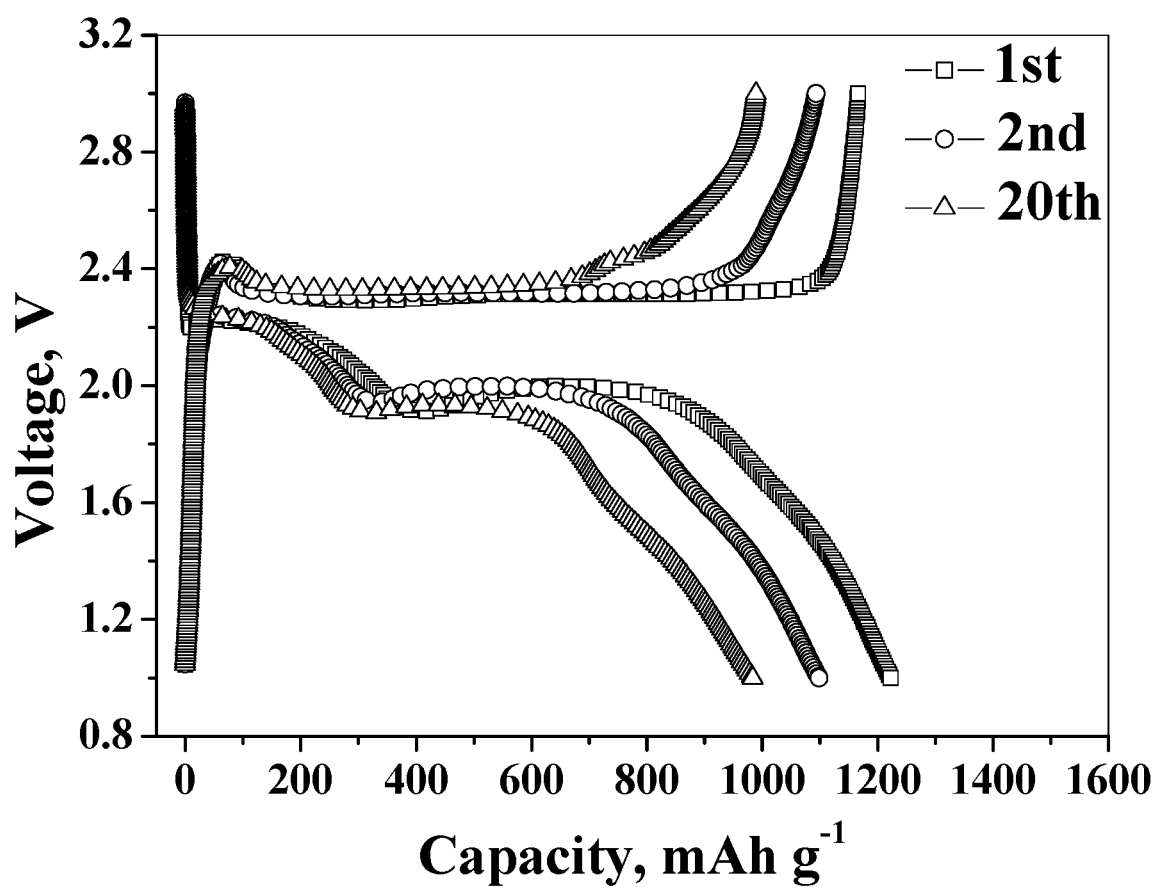

FIGS. 4A, 4B, and 4C illustrate charge/discharge curves, cycle performance, and coulombic efficiency, respectively, of a Li/S cell at C/10 using 5 M LiTFSI/(DOL and 1NM2) (1/1, v/v). The Li/S cell has a Li anode, a separator, and a S/C cathode. The S/C cathode has a sulfur loading of 70 wt. %. As shown, after optimization of carbon structure, the Li/S cell with a higher sulfur loading can demonstrate even higher reversible capacities of over 1000 mAh/g. The initial coulombic efficiency was also improved to 95%, and the coulombic efficiencies in the subsequent cycles were almost 100%. The results show that by using the poly(ethylene oxide) siloxane electrolytes, the dissolution of polysulfides/polyselenides can be suppressed.

Para. 1. An electrochemical device comprising: a cathode comprising elemental selenium, elemental sulfur, or a selenium-sulfur composite of formula S$_x$Se$_y$, wherein 0.1<x/y<50; a negative electrode; a separator; and an electrolyte comprising: a poly(alkyleneoxide) siloxane; and a salt; wherein: a concentration of the salt in the electrolyte is sufficient to prevent or suppress dissolution of polysulfides/polyselenides formed during cycling of the device.

Para. 2. The electrochemical device of Para. 2, wherein the concentration of the salt in the electrolyte is greater than 2 M, greater than 3 M, greater than 4 M, from 2 M to 5 M, from 2 M to 10 M, or from 5 M to 10 M, and the molarity is determined as moles of salt divided by the volume of the electrolyte, without considering the volume change of the electrolyte composition due to dissolution of the salt.

Para. 3. The electrochemical device of Para. 1 or 2, wherein the poly(alkyleneoxide) siloxane is a compound having at least one poly(alkylene oxide) ("PAO") moiety on a silicon atom.

Para. 4. The electrochemical device of Para. 1, 2, or 3, wherein: the poly(alkyleneoxide) siloxane is a compound of Formula I:

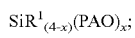

SiR$^1{}_{(4-x)}$(PAO)$_x$;

x is 1, 2, or 3; and PAO is a poly(alkyleneoxide) group; each R$^1$ is independently hydrogen, a substituted or unsubstituted alkyl group having from 1 to 12 carbon atoms, a substituted or unsubstituted alkenyl group having from 2 to 12 carbon atoms, or a further siloxane group of Formula II:

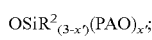

OSiR$^2{}_{(3-x')}$(PAO)$_{x'}$;

each R$^2$ is independently hydrogen, a substituted or unsubstituted alkyl group having from 1 to 12 carbon atoms, a substituted or unsubstituted alkenyl group having from 2 to 12 carbon atoms, or a further siloxane group of formula —OSiR$^2{}_{(3-x')}$(PAO)$_{x'}$; and x' is 0, 1, 2, or 3.

Para. 5. The electrochemical device of Para. 4, wherein the poly(alkyleneoxide) siloxane is group of Formula III:

—(CH$_2$)$_p$[O(CH$_2$)$_n$]$_q$(O)$_{q'}$R$^3$; and wherein: R$^3$ is H, alkyl, or a group of Formula IV

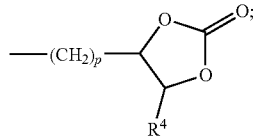

IV n is an integer from 1 to 12; p is an integer from 0 to 12; q represents a polymeric repeat unit; q' is 0 or 1; and R$^4$ is H, alkyl, or alkenyl.

Para. 6. The electrochemical device of Para. 5, wherein q is from 1 to 1000.

Para. 7. The electrochemical device of Para. 5 or 6, wherein q is from 1 to 500.

Para. 8. The electrochemical device of Para. 5, 6, or 7, wherein q is from 1 to 100.

Para. 9. The electrochemical device of Para. 5, 6, 7, or 8, wherein q is from 1 to 50.

Para. 10. The electrochemical device of Para. 5, 6, 7, 8, or 9, wherein q is from 1 to 10.

Para. 11. The electrochemical device of any one of Paras. 5-10, wherein R$^3$ is H or a C$_1$-C$_{12}$ alkyl.

Para. 12. The electrochemical device of Para. 11, wherein R$^3$ is methyl, ethyl, or propyl.

Para. 13. The electrochemical device of any one of Paras. 5-12, wherein n is 1, 2, or 3.

Para. 14. The electrochemical device of any one of Paras. 5-13, wherein p is 0, 1, 2, or 3.

Para. 15. The electrochemical device of any one of Paras. 5-14, wherein R$^4$ is H, C$_1$-C$_{10}$ alkyl, or C$_1$-C$_{10}$ alkenyl.

Para. 16. The electrochemical device of any one of Paras. 5-15, wherein q is 1, 2, 3, 4, 5, 6, 7, 8, 9, or 10.

Para. 17. The electrochemical device of any one of Paras. 5-16, wherein the PAO is a poly(ethylene oxide) or poly(propylene oxide) group.

Para. 18. The electrochemical device of any one of Paras. 5-17, wherein the PAO is a group of Formula III, where n is 2 or 3; p is 0, 1, 2, or 3; R$^3$ is H, methyl, ethyl, propyl, or a group of Formula IV; q is 1, 2, 3, 4, 5, 6, 7, 8, 9, or 10; R$^3$ is a group of Formula IV; and R$^4$ is H, methyl, ethyl, or propyl.

Para. 19. The electrochemical device of any one of the preceding Paras., wherein the poly(alkyleneoxide) siloxane is (CH$_3$)$_3$SiO(CH$_2$CH$_2$O)$_n$CH$_3$, (CH$_3$)$_3$SiCH$_2$O(CH$_2$CH$_2$O)$_n$CH$_3$, Si[O(CH$_2$CH$_2$O)$_p$CH$_3$]$_4$, (CH$_3$)$_3$Si(CH$_2$)$_3$O(CH$_2$CH$_2$O)$_n$CH$_3$, (CH$_3$)$_2$Si[O(CH$_2$CH$_2$O)$_n$CH$_3$]$_2$, CH$_3$SiOR$^3$, CH$_3$Si[O(CH$_2$CH$_2$O)$_p$CH$_3$]$_3$, (CH$_3$)$_2$Si[O(CH$_2$CH$_2$O)$_n$CH$_3$][(CH$_2$)$_3$—O—(CH$_2$CH$_2$O)$_n$CH$_3$], (CH$_3$)$_3$Si(CH$_2$)$_3$OR$^3$, CH$_3$O(CH$_2$CH$_2$O)$_n$SiO(CH$_3$)$_2$O (CH$_3$)$_2$SiO(CH$_2$CH$_2$O)$_n$CH$_3$, CH$_3$O(CH$_2$CH$_2$O)$_n$Si(CH$_3$)$_2$O(CH$_3$)$_2$SiO(CH$_2$CH$_2$O)$_n$CH$_3$, CH$_3$O(CH$_2$CH$_2$O)$_n$CH$_2$Si(CH$_3$)$_2$O(CH$_3$)$_2$SiCH$_2$O(CH$_2$CH$_2$O)$_n$CH$_3$, CH$_3$O(CH$_2$CH$_2$O)$_n$(CH$_2$)$_3$Si(CH$_3$)$_2$O(CH$_3$)$_2$Si(CH$_2$)$_3$O(CH$_2$CH$_2$O)$_n$CH$_3$, (CH$_3$)$_3$SiO(CH$_3$)$_2$Si(CH$_2$)$_3$O (CH$_2$CH$_2$O)$_n$CH$_3$, (CH$_3$)$_3$SiO(CH$_3$)$_2$Si(CH$_2$)$_2$O (CH$_2$CH$_2$O)$_n$CH$_3$, (CH$_3$)$_3$SiO(CH$_3$)$_2$SiO(CH$_2$CH$_2$O)$_n$CH$_3$, (CH$_3$)$_3$SiO(CH$_3$)$_2$SiOR$^3$, R$^3$OSi(CH$_3$)$_2$O(CH$_3$)$_2$SiOR$^3$, (CH$_3$)$_3$SiO(CH$_3$)$_2$Si(CH$_2$)$_3$OR$^3$, R$^3$O(CH$_2$)$_3$Si(CH$_3$)$_2$O (CH$_3$)$_2$Si(CH$_2$)$_3$OR$^3$, CH$_3$O(CH$_2$CH$_2$O)$_n$Si(CH$_3$)$_2$OSi(CH$_3$)$_2$O(CH$_3$)$_2$SiO(CH$_2$CH$_2$O)$_n$CH$_3$, CH$_3$O(CH$_2$CH$_2$O)$_{n'}$(CH$_2$)$_3$Si(CH$_3$)$_2$OSi(CH$_3$)$_2$O(CH$_3$)$_2$Si(CH$_2$)$_3$O(CH$_3$)$_2$SiO (CH$_2$CH$_2$O)$_n$CH$_3$, [(CH$_3$)$_3$SiO]$_2$Si(CH$_3$)O(CH$_2$CH$_2$O)$_n$CH$_3$, [(CH$_3$)$_3$SiO]$_2$Si(CH$_3$)(CH$_2$)$_3$O(CH$_2$CH$_2$O)$_n$CH$_3$, [(CH$_3$)$_3$SiO]$_2$Si(CH$_3$)O(CH$_2$CH$_2$O)$_n$CH$_3$Si [OSi(CH$_3$)$_3$]$_2$, R$^3$OSi(CH$_3$)$_2$OSi(CH$_3$)$_2$O(CH$_3$)$_2$SiOR$^3$, R$^3$OSi(CH$_3$)$_2$OSi(CH$_3$)$_2$OSi(CH$_3$)$_3$, R$^3$O(CH$_2$)$_3$Si(CH$_3$)$_2$OSi(CH$_3$)$_2$O(CH$_3$)$_2$Si(CH$_2$)$_3$OR$^3$, R$^3$O(CH$_2$)$_3$Si(CH$_3$)$_2$OSi(CH$_3$)$_2$OSi(CH$_3$)$_3$, R$^3$OSi(CH$_3$)$_2$OSi(CH$_3$)$_2$O(CH$_3$)$_2$SiO(CH$_2$CH$_2$O)$_n$CH$_3$, R$^3$O(CH$_2$)$_3$Si(CH$_3$)$_2$OSi(CH$_3$)$_2$O(CH$_3$)$_2$Si(CH$_2$)$_3$O(CH$_2$CH$_2$O)$_n$CH$_3$, or a mixture of any two or more such poly(ethyleneoxide) siloxanes, wherein R$^3$ is a carbonate group of Formula IV; n is 2, 3, 4, 5, 6, or 7; n' is 2, 3, 4, or 5; p is 2, 3, or 4; and p' is 2 or 3.

Para. 20. The electrochemical device of any one of the preceding Paras., wherein the poly(alkyleneoxide) siloxane is 2,2,4,4-tetramethyl-3,6,9-trioxa-2-siladecane; 2-dimethyl-4,7,10,13-tetraoxa-2-silatetradecane; 2,4,7-trioxa-8-siladecane; 2,2-dimethyl-1-phenyl-3,6,9-trioxa-2-siladecane; 2,2-dimethyl-3,6,9-trioxa-2-poly(ethyleneoxide) siladecane; 2,2-dimethyl-3,6,9,12-tetraoxa-2-silatridecane; (5R)-5,8,8,9,9-pentamethyl-[3-(phenylsulfonyl)propyl]-2,4,7-trioxa-8-siladecane; 1-[1-trimethylsiloxanylethyl]ethylene carbonate ("INN/IC") or a mixture of any two or more thereof.

Para. 21. The electrochemical device of any one of the preceding Paras., wherein the poly(alkyleneoxide) siloxane is 2,2-dimethyl-3,6,9-trioxa-2-siladecane (CH$_3$(OCH$_2$CH$_2$)$_2$Si(CH$_3$)$_3$ or is:

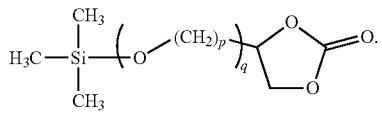

Para. 22. The electrochemical device of Para. 21, wherein the poly(alkyleneoxide) siloxane is:

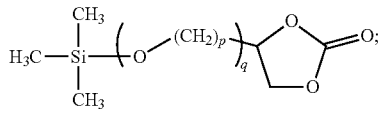

p is 2, and q is 1.

Para. 23. The electrochemical device of any one of the preceding Paras., wherein the concentration of the salt in the electrolyte is from 2 M to 5 M.

Para. 24. The electrochemical device of any one of the preceding Paras., wherein the electrolyte further comprises a co-solvent.

Para. 25. The electrochemical device of Para. 24, wherein the co-solvent comprises ethylene carbonate, dimethyl carbonate, ethyl methyl carbonate, diethyl carbonate, propylene carbonate, fluorinated carbonate, 1,3-dioxolane ("DOL"), dimethoxyethane ("DME"), di(ethylene glycol) dimethyl ether, tri(ethylene glycol) dimethyl ether, tetra(elene glycol) dimethyl ether ("TEGDME"), 1,4-dioxane, 1,1,2,2-tetrafluoroethyl-2,2,3,3-tetrafluoropropyl ether; 1,1,2,2-tetrafluoroethyl-2,2,3,3,3-pentafluoropropyl ether; 2,2,2-trisfluoroethyl-1,1,2,3,3,3-hexafluoropropyl ether; ethyl-1,1,2,3,3,3-hexafluoropropyl ether; difluoromethyl-2,2,3,3,3-pentafluoropropyl ether; difluoromethyl-2,2,3,3-tetrafluoropropyl ether; 2-fluoro-1,3-dioxolane; 2,2-difluoro-1,3-dioxolane; 2-trifluoromethyl-1,3-dioxolane; 2,2-bis(trifluoromethyl)-1,3-dioxolane; 4-fluoro-1,3-dioxolane; 4,5-difluoro-1,3-dioxolane, dimethyl sulfoxide, sulfone, tetrahydrofuran, ionic liquids, or a mixture of any two or more thereof.

Para. 26. The electrochemical device of Para. 25 or 26, wherein the co-solvent is present from about 0.1 vol % to about 80 vol % in the electrolyte.

Para. 27. The electrochemical device of Para. 24, 25, or 26, wherein the co-solvent comprises 1,1,2,2-tetrafluoroethyl-2,2,3,3-tetrafluoropropyl ether, 1,3-dioxolane, dimethoxyethane, or a mixture of any two or more thereof.

Para. 28. The electrochemical device of any one of Paras. 1-27 that is a lithium battery.

Para. 29. The electrochemical device of Para. The electrochemical device of any one of Paras. 1-28, wherein the salt is $LiClO_4$, $LiPF_6$, $LiAsF_6$, $LiBF_4$, $LiB(C_2O_4)_2$ ("LiBOB"), $LiBF_2(C_2O_4)$ ("LiODFB"), $LiCF_3SO_3$, $LiN(SO_2F)_2$ ("LiFSI"), $LiPF_3(C_2F_5)_3$ ("LiFAP"), $LiPF_4(CF_3)_2$, $LiPF_3(CF_3)_3$, $LiN(SO_2CF_3)$, $LiCF_3CO_2$, $LiC_2F_5CO_2$, $LiPF_2(C_2O_4)_2$, $LiPF_4C_2O_4$, $LiN(CF_3SO_2)_2$, $LiC(CF_3SO_2)_3$, $LiN(SO_2C_2F_5)_2$, lithium alkyl fluorophosphates, $Li(C_2O_4)_2$, $LiBF_2C_2O_4$, $Li_2B_{12}X_{12-p}H_p$, $Li_2B_{10}X_{10-y}H_y$, or a mixture of any two or more thereof.

Para. 30. The electrochemical device of any one of Paras. 1-27 that is a sodium battery.

Para. 31. The electrochemical device of any one of Paras. 1-27 and 30, wherein the salt is $NaClO_4$, $NaPF_6$, $NaAsF_6$, $NaSbF_6$, $NaAlCl_4$, $NaBF_4$, $NaCF_3SO_3$, $NaN(SO_2CF_3)_2$, or a mixture of any two or more thereof.

Para. 32. The electrochemical device of any one of Paras. 1-31, wherein the cathode comprises elemental sulfur.

Para. 33. The electrochemical device of any one of Paras. 1-31, wherein the cathode comprises elemental selenium.

Para. 34. The electrochemical device of any one of Paras. 1-31, wherein the cathode comprises a sulfur-selenium composite.

Para. 35. The electrochemical device of any one of Paras. 1-34, wherein the cathode further comprises a carbon matrix.

Para. 36. The electrochemical device of Para. 35, wherein the carbon matrix comprises graphite, graphene, expanded graphite, reduced graphene oxide, Black Pearls® 2000, Ketjenblack®, acetylene black, carbon black, a metal-organic framework, porous organic polymer, porous carbon, carbon spheres, carbon aerogel, single-walled carbon nanotubes, multi-walled carbon nanotubes, carbon nanofibers, carbon nanotube arrays, polypyrrole, polyaniline, or a mixture of any two or more thereof.

Para. 37. The electrochemical device of any one of Paras. 1-36, wherein the separator comprises a sulfonated tetrafluoroethylene-based fluoropolymer-copolymer, a sulfonated poly(ether ether ketone), a polysulfone, a polyethylene, a polypropylene, an ethylene-propylene copolymer, a polyimide, or a polyvinyldifluoride.

Para. 38. The electrochemical device of any one of the preceding Paras., wherein the electrolyte further comprises an anion receptor to improve the battery cycle life.

Para. 39. The electrochemical device of Para. 38, wherein anion receptor comprises tri(propyl)borate; tris(1,1,1,3,3,3-hexafluoro-propan-2-yl)borate; tris(1,1,1,3,3,3-hexafluoro-2-phenyl-propan-2-yl)borate; tris(1,1,1,3,3,3-hexafluoro-2-(trifluoromethyl)propan-2-yl)borate; triphenyl borate; tris(4-fluorophenyl)borate; tris(2,4-difluorophenyl)borate; tris(2,3,5,6-tetrafluorophenyl)borate; tris(pentafluorophenyl)borate; tris(3-(trifluoromethyl)phenyl)borate; tris(3,5-bis(trifluoromethyl)phenyl)borate; tris(pentafluorophenyl)borane; 2-(2,4-difluorophenyl)-4-fluoro-1,3,2-benzodioxaborole; 2-(3-trifluoromethyl phenyl)-4-fluoro-1,3,2-benzodioxaborole; 2,5-bis(trifluoromethyl)phenyl-4-fluoro-1,3,2-benzodioxaborole; 2-(4-fluorophenyl)-tetrafluoro-1,3,2-benzodioxaborole; 2-(2,4-difluorophenyl)-tetrafluoro-1,3,2-benzodioxaborole; 2-(pentafluorophenyl)-tetrafluoro-1,3,2-benzodioxaborole; 2-(2-trifluoromethyl phenyl)-tetrafluoro-1,3,2-benzodioxaborole; 2,5-bis(trifluoromethyl phenyl)-tetrafluoro-1,3,2-benzodioxaborole; 2-phenyl-4,4,5,5-tetra(trifluoromethyl)-1,3,2-benzodioxaborolane; 2-(3,5-difluorophenyl-4,4,5,5-tetrakis(trifluoromethyl))-1,3,2-dioxaborolane; 2-(3,5-difluorophenyl-4,4,5,5-tetrakis(trifluoromethyl)-1,3,2-dioxaborolane; 2-pentafluorophenyl-4,4,5,5-tetrakis(trifluoromethyl)-1,3,2-dioxaborolane; bis(1,1,1,3,3,3-hexafluoroisopropyl)phenylboronate; bis(1,1,1,3,3,3-hexafluoroisopropyl)-3,5-difluorophenylboronate; bis(1,1,1,3,3,3-hexafluoroisopropyl) pentafluorophenylboronate; or a mixture of any two or more thereof.

Para. 40. The electrochemical device of Para. 38 or 39, where the anion receptor is present in the electrolyte at a concentration of about 0.0001 to about 10 wt %.

Para. 41. The electrochemical device of any one of claims 1-40, wherein the electrolyte further comprises a stabilizing additive to extend the cycle life and suppress the shuttle effect.

Para. 42. The electrochemical device of Para. 41, wherein the stabilizing additive comprises an N—O compound, a polysulfide, a phosphorus pentasulfide, or a mixture of any two or more thereof.

Para. 43. The electrochemical device of Para. 41 or 42, where the additive is present at a concentration of about 0.0001 to about 10 wt % in the electrolyte.

While certain embodiments have been illustrated and described, it should be understood that changes and modifications can be made therein in accordance with ordinary skill in the art without departing from the technology in its broader aspects as defined in the claims. The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

Other embodiments are set forth in the following claims.

What is claimed is:

1. An electrochemical device comprising:
a cathode comprising elemental selenium, elemental sulfur, or a selenium-sulfur composite of formula $S_xSe_y$, wherein $0.1<x/y<50$;
a negative electrode;
a separator; and
an electrolyte comprising:
a poly(alkyleneoxide) siloxane; and
a salt;
wherein:
a concentration of the salt in the electrolyte is from greater than 2 M to 10 M, and the molarity is determined as moles of salt divided by the volume of the electrolyte, without considering the volume change of the electrolyte composition due to dissolution of the salt and is sufficient to prevent or suppress dissolution of polysulfides/polyselenides formed during cycling of the device.

2. The electrochemical device of claim 1, wherein the concentration of the salt in the electrolyte is from about 5 M to 10 M, and the molarity is determined as moles of salt divided by the volume of the electrolyte, without considering the volume change of the electrolyte composition due to dissolution of the salt.

3. The electrochemical device of claim 1, wherein the poly(alkyleneoxide) siloxane is a compound having at least one poly(alkylene oxide) ("PAO") moiety on a silicon atom.

4. The electrochemical device of claim 1, wherein:
the poly(alkyleneoxide) siloxane is a compound of Formula I:

$$SiR^1_{(4-x)}(PAO)_x;$$

x is 1, 2, or 3; and
PAO is a poly(alkyleneoxide) group;
each $R^1$ is independently hydrogen, a substituted or unsubstituted alkyl group having from 1 to 12 carbon atoms, a substituted or unsubstituted alkenyl group having from 2 to 12 carbon atoms, or a further siloxane group of Formula II:

$$-OSiR^2_{(3-x')}(PAO)_{x'};$$

each $R^2$ is independently hydrogen, a substituted or unsubstituted alkyl group having from 1 to 12 carbon atoms, a substituted or unsubstituted alkenyl group having from 2 to 12 carbon atoms, or a further siloxane group of formula $-OSiR^2_{(3-x')}(PAO)_{x'}$; and
x' is 0, 1, 2, or 3.

5. The electrochemical device of claim 4, wherein the PAO is a group of Formula III:

$$-(CH_2)_p[O(CH_2)_n]_q(O)_{q'}\cdot R^3;\ \text{and}$$

wherein:
$R^3$ is H, alkyl, or a group of Formula IV n is an integer from 1 to 12;
p is an integer from 0 to 12;
q represents a polymeric repeat unit;
q' is 0 or 1; and
$R^4$ is H, alkyl, or alkenyl.

6. The electrochemical device of claim 5, wherein q is from 1 to 1000.

7. The electrochemical device of claim 5, wherein q is from 1 to 10.

8. The electrochemical device of claim 5, wherein $R^3$ is H or a $C_1$-$C_{12}$ alkyl.

9. The electrochemical device of claim 5, wherein n is 1, 2, or 3.

10. The electrochemical device of claim 5, wherein p is 0, 1, 2, or 3.

11. The electrochemical device of claim 5, wherein $R^4$ is H, $C_1$-$C_{10}$ alkyl, or $C_1$-$C_{10}$ alkenyl.

12. The electrochemical device of claim 5, wherein the PAO is a poly(ethylene oxide) or poly(propylene oxide) group.

13. The electrochemical device of claim 5, wherein the poly(alkyleneoxide) siloxane is $(CH_3)_3SiO(CH_2CH_2O)_nCH_3$, $(CH_3)_3SiCH_2O(CH_2CH_2O)_nCH_3$, $Si[O(CH_2CH_2O)_pCH_3]_4$, $(CH_3)_3Si(CH_2)_3O(CH_2CH_2O)_nCH_3$, $(CH_3)_2Si[O(CH_2CH_2O)_nCH_3]_2$, $CH_3SiOR^3$, $CH_3Si[O(CH_2CH_2O)_pCH_3]_3$, $(CH_3)_2Si[O(CH_2CH_2O)_nCH_3][(CH_2)_3-O-(CH_2CH_2O)_nCH_3]$, $(CH_3)_3Si(CH_2)_3OR^3$, $CH_3O(CH_2CH_2O)_nSiO(CH_3)_2O(CH_3)_2SiO(CH_2CH_2O)_nCH_3$, $CH_3O(CH_2CH_2O)_nSi(CH_3)_2O(CH_3)_2SiO(CH_2CH_2O)_nCH_3$, $CH_3O(CH_2CH_2O)_nCH_2Si(CH_3)_2O(CH_3)_2SiCH_2O(CH_2CH_2O)_nCH_3$, $CH_3O(CH_2CH_2O)_n(CH_2)_3Si(CH_3)_2O(CH_3)_2Si(CH_2)_3O(CH_2CH_2O)_nCH_3$, $(CH_3)_3SiO(CH_3)_2Si(CH_2)_3O(CH_2CH_2O)_nCH_3$, $(CH_3)_3SiO(CH_3)_2Si(CH_2)_2O(CH_2CH_2O)_nCH_3$, $(CH_3)_3SiO(CH_3)_2SiO(CH_2CH_2O)_nCH_3$, $(CH_3)_3SiO(CH_3)_2SiOR^3$, $R^3OSi(CH_3)_2O(CH_3)_2SiOR^3$, $(CH_3)_3SiO(CH_3)_2Si(CH_2)_3OR^3$, $R^3O(CH_2)_3Si(CH_3)_2O(CH_3)_2Si(CH_2)^3OR^3$, $CH_3O(CH_2CH_2O)_nSi(CH_3)_2OSi(CH_3)_2O(CH_3)_2SiO(CH_2CH_2O)_nCH_3$, $CH_3O(CH_2CH_2O)_n(CH_2)_3Si(CH_3)_2OSi(CH_3)_2O$ $(CH_3)_2Si(CH_2)_3O(CH_3)_2SiO(CH_2CH_2O)_nCH_3$, $[(CH_3)_3SiO]_2Si(CH_3)O(CH_2CH_2O)_nCH_3$, $[(CH_3)_3SiO]_2Si(CH_3)(CH_2)_3O(CH_2CH_2O)_nCH_3$, $[(CH_3)_3SiO]_2Si(CH_3)O(CH_2CH_2O)_nCH_3Si[OSi(CH_3)_3]_2$, $R^3OSi(CH_3)_2OSi(CH_3)_2O(CH_3)_2SiOR^3$, $R^3OSi(CH_3)_2OSi(CH_3)_2OSi(CH_3)_3$, $R^3O(CH_2)_3Si(CH_3)_2OSi(CH_3)_2O(CH_3)_2Si(CH_2)_3OR^3$, $R^3O(CH_2)_3Si(CH_3)_2OSi(CH_3)_2OSi (CH₃)₃, R³OSi(CH₃)₂OSi(CH₃)₂O(CH₃)₂SiO(CH₂CH₂O)ₙCH₃, R³O(CH₂)₃Si(CH₃)₂OSi(CH₃)₂O(CH₃)₂Si(CH₂)₃O(CH₂CH₂)ₙCH₃, or a mixture of any two or more such poly(ethyleneoxide) siloxanes, wherein R³ is a carbonate group of Formula IV; n is 2, 3, 4, 5, 6, or 7; n' is 2, 3, 4, or 5; p is 2, 3, or 4; and p' is 2 or 3.

14. The electrochemical device of claim 1, wherein the poly(alkyleneoxide) siloxane is 2,2-dimethyl-3,6,9-trioxa-2-siladecane (CH₃(OCH₂CH₂)₂OSi(CH₃)₃) or is:

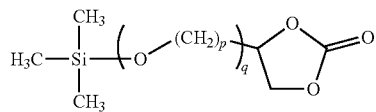

wherein: p is 2, 3, or 4, and q is 1.

15. The electrochemical device of claim 1, wherein the electrolyte further comprises a co-solvent.

16. The electrochemical device of claim 15, wherein the co-solvent comprises ethylene carbonate, dimethyl carbonate, ethyl methyl carbonate, diethyl carbonate, propylene carbonate, fluorinated carbonate, 1,3-dioxolane ("DOL"), dimethoxyethane ("DME"), di(ethylene glycol) dimethyl ether, tri(ethylene glycol) dimethyl ether, tetra(ethylene glycol) dimethyl ether ("TEGDME"), 1,4-dioxane, 1,1,2,2-tetrafluoroethyl-2,2,3,3-tetrafluoropropyl ether; 1,1,2,2-tetrafluoroethyl-2,2,3,3,3-pentafluoropropyl ether; 2,2,2-trisfluoroethyl-1,1,2,3,3,3-hexafluoropropyl ether; ethyl-1,1,2,3,3,3-hexafluoropropyl ether; difluoromethyl-2,2,3,3,3-pentafluoropropyl ether; difluoromethyl-2,2,3,3-tetrafluoropropyl ether; 2-fluoro-1,3-dioxolane; 2,2-difluoro-1,3-dioxolane; 2-trifluoromethyl-1,3-dioxolane; 2,2-bis(trifluoromethyl)-1,3-dioxolane; 4-fluoro-1,3-dioxolane; 4,5-difluoro-1,3-dioxolane, dimethyl sulfoxide, sulfone, tetrahydrofuran, ionic liquids, or a mixture of any two or more thereof.

17. The electrochemical device of claim 1 that is a lithium battery and the salt is LiClO₄, LiPF₆, LiAsF₆, LiBF₄, LiB(C₂O₄)₂ ("LiBOB"), LiBF₂(C₂O₄) ("LiODFB"), LiCF₃SO₃, LiN(SO₂F)₂ ("LiFSI"), LiPF₃(C₂F₅)₃ ("LiFAP"), LiPF₄(CF₃)₂, LiPF₃(CF₃)₃, LiN(SO₂CF₃), LiCF₃CO₂, LiC₂F₅CO₂, LiPF₂(C₂O₄)₂, LiPF₄C₂O₄, LiN(CF₃SO₂)₂, LiC(CF₃SO₂)₃, LiN(SO₂C₂F₅)₂, lithium alkyl fluorophosphates, Li(C₂O₄)₂, LiBF₂C₂O₄, Li₂B₁₂X₁₂₋ₚHₚ, Li₂B₁₀X₁₀₋ᵧHᵧ, or a mixture of any two or more thereof.

18. The electrochemical device of claim 1 that is a sodium battery, wherein the salt is NaClO₄, NaPF₆, NaAsF₆, NaSbF₆, NaAlCl₄, NaBF₄, NaCF₃SO₃, NaN(SO₂CF₃)₂, or a mixture of any two or more thereof.

19. The electrochemical device of claim 1, wherein the concentration of the salt in the electrolyte is from about 2.5 M to 10 M, and the molarity is determined as moles of salt divided by the volume of the electrolyte, without considering the volume change of the electrolyte composition due to dissolution of the salt.

20. The electrochemical device of claim 1, wherein the concentration of the salt in the electrolyte is from about 3 M to 10 M, and the molarity is determined as moles of salt divided by the volume of the electrolyte, without considering the volume change of the electrolyte composition due to dissolution of the salt.

* * * * *